(12) United States Patent
Mei et al.

(10) Patent No.: US 12,319,013 B2
(45) Date of Patent: Jun. 3, 2025

(54) METHOD FOR PREPARING HIGH-PRESSURE GAS STORAGE TANK WITHOUT LINER

(71) Applicant: NUCLEAR MATERIAL HITECH (SUZHOU) ) CO., LTD., Taicang (CN)

(72) Inventors: Longwei Mei, Taicang (CN); Guangming Zhang, Taicang (CN); Hongxi Jian, Taicang (CN)

(73) Assignee: NUCLEAR MATERIAL HITECH (SUZHOU)) CO., LTD., Taicang (CN)

( * ) Notice: Subject to any disclaimer, the term of this patent is extended or adjusted under 35 U.S.C. 154(b) by 0 days.

(21) Appl. No.: 17/923,543

(22) PCT Filed: Sep. 1, 2022

(86) PCT No.: PCT/CN2022/116393
§ 371 (c)(1),
(2) Date: Nov. 4, 2022

(87) PCT Pub. No.: WO2024/040631
PCT Pub. Date: Feb. 29, 2024

(65) Prior Publication Data
US 2025/0074011 A1  Mar. 6, 2025

(30) Foreign Application Priority Data
Aug. 24, 2022 (CN) .......................... 202211015396.8

(51) Int. Cl.
*B29C 33/52* (2006.01)
*B29C 70/06* (2006.01)
(Continued)

(52) U.S. Cl.
CPC .............. *B29C 70/30* (2013.01); *B29C 33/52* (2013.01); *B29C 70/06* (2013.01); *B29C 70/54* (2013.01); *B29L 2031/7156* (2013.01)

(58) Field of Classification Search
CPC .... B29C 33/52; B29C 2033/525; B29C 33/54
See application file for complete search history.

(56) References Cited

U.S. PATENT DOCUMENTS 3,692,551 A * 9/1972 Weaver ............... B29C 33/0033
106/38.3
9,825,131 B2 * 11/2017 Laven .................... H10D 30/66

OTHER PUBLICATIONS

Kosar, Iqbal, Development of a Liner-less Composite CNG Cylinder and Improved Mechanical Properties of Cylinder Materials, Master of Philosophy Thesis, The Hong Kong University of Science and Technology (Aug. 2008), 91 pages. (Year: 2008).*

* cited by examiner

*Primary Examiner* — Matthew J Daniels
(74) *Attorney, Agent, or Firm* — Fideli Law PLLC; Qiang Li

(57) ABSTRACT

The method includes steps of preparing a salt core liner, installing connectors, winding carbon fiber, curing carbon fiber, removing salt core, and the like. The dried salt material is used as the material for preparing the liner, and the salt material cured and formed is used as the support body which has sufficient structural strength to be capable of being wound with the carbon fiber on the outer periphery side of the salt core liner so as to ensure that a shape of the wound carbon fiber reaches an expected design purpose and to ensure the structural strength of the wound carbon fiber. The salt core is directly dissolved by water after the high-pressure gas storage tank is prepared, to obtain the carbon fiber tank without a liner structure. The whole high-pressure gas storage tank is fully reduced in weight, convenient for transportation, and has increased inner volume.

8 Claims, 3 Drawing Sheets

(51) Int. Cl.
  *B29C 70/30* (2006.01)
  *B29C 70/32* (2006.01)
  *B29C 70/54* (2006.01)
  *B29L 31/00* (2006.01)

METHOD FOR PREPARING HIGH-PRESSURE GAS STORAGE TANK WITHOUT LINER

CROSS-REFERENCE TO RELATED APPLICATION

This application is a national stage of International Application No. PCT/CN2022/116393, filed on Sep. 1, 2022, which claims priority to Chinese Patent Application No. 202211015396.8, filed on Aug. 24, 2022. Both of the aforementioned applications are hereby incorporated by reference in their entireties.

TECHNICAL FIELD

The present disclosure relates to the technical field of preparing a high-pressure gas storage tank, and particularly to a method for preparing a high-pressure gas storage tank without a liner.

BACKGROUND

The prior art includes a plurality of methods for preparing high-pressure gas storage tanks without liners. In some of the plurality of methods, metal liners are manufactured as liners of high-pressure gas storage tanks, and steel cylinders are provided outside the metal liners; some liners are made from polymer materials, and steel cylinders are also sleeved on the liners, resulting in a large mass of the high-pressure gas storage tank, inconvenient transportation and movement, and the like. Furthermore, preparing the metal liners with polymer materials is prone to cause environmental pollution and other problems. For example, patent document CN 113551148A discloses a high-pressure hydrogen storage tank having a composite liner fully wound by carbon fiber, and a preparation method thereof, in which the high-pressure hydrogen storage tank includes a metal liner, a polyethylene film layer connected to an inner surface of the metal liner, and a carbon fiber layer wound on an outer surface of the metal liner. Said preparation method overcomes the shortcomings of the high-pressure hydrogen storage tank having a composite liner fully wound by carbon fiber in the prior art, improves the comprehensive performance of the high-pressure hydrogen storage tank, and reduces the manufacturing cost. However, even for the composite liner, it still has a certain mass, leads to an increase in the mass of the whole tank, and thus affects the storage capacity of materials

SUMMARY

A purpose of the present disclosure is to provide a method for preparing a high-pressure gas storage tank without a liner to solve the problems existing in the above-mentioned prior art. In this method, a salt core is manufactured as a support body, carbon fiber is wound on the outer peripheral wall of the salt core, and the wound carbon fiber is cured to ensure strength thereof; after a tank is prepared, the salt core is directly dissolved by water, and the dissolved salt core solution has no effect on structural strength of the carbon fiber, thereby ensuring quality of the whole tank.

In order to realize the purpose above, the present disclosure provides a method for preparing a high-pressure gas storage tank without a liner, including following steps:

preparing salt core liner step, configured for providing a mold for forming a salt core, wherein a molding cavity of the mold is matched in structure with an inner cavity of the high-pressure gas storage tank to be prepared; melting salt material subjected to a drying treatment and pouring it into the molding cavity; pressurizing the salt material in the molding cavity, and cooling the salt material so as to be shaped into the salt core in the molding cavity, which match the inner cavity of the high-pressure gas storage tank to be prepared in structure;

installing connector step, configured for providing two connectors for entering and leaving of high-pressure gas, and fixing the two connectors at two ends of the salt core along an axial direction of the salt core;

winding carbon fiber step, configured for winding carbon fiber on an entire outer peripheral wall of the salt core by carbon fiber winding equipment, with connection portions between the salt core and the connectors being covered by the carbon fiber;

curing carbon fiber step, configured for putting the salt core wound with the carbon fiber into a curing furnace for heating and curing to maintain a shape of the carbon fiber wound on the salt core; and removing salt core step, configured for filling water through the connectors towards an inside of the carbon fiber cured, for dissolving the salt core; cleaning and drying the inside of the carbon fiber cured after the salt core is dissolved, to complete preparation of the high-pressure gas storage tank.

In some embodiments, in the preparing salt core step, the two ends of the salt core are provided with grooves coaxial with the salt core, the connectors are embedded in the grooves, edges of the connectors are smoothly connected with edges of the grooves; and the molding cavity is provided with bosses which are used for forming the grooves and correspond to the two ends of the salt core.

In some embodiments, in the preparing salt core step, a central passage is provided through an axial center of the salt core, openings at the two ends of the central passage are respectively communicated with the grooves, and a connecting rod for detachably connecting the two connectors is inserted in the central passage.

In some embodiments, a molding rod is provided in the molding cavity for forming the central passage, and the molding rod extends along an axial direction of the molding cavity.

In some embodiments, the connecting rod passes through the connectors and protrudes from sides of the connectors away from the salt core, and ends of the connecting rod protruding from the connectors are detachably connected with annular sleeves for abutting the connectors.

In some embodiments, the annular sleeves are threadedly connected with the connecting rod.

In some embodiments, in the winding carbon fiber step, after the two connectors are installed on the two ends of the salt core, an epoxy resin layer is coated on an outer peripheral side of the salt core and the connectors.

In some embodiments, after the preparing salt core step, the salt core formed is placed in a sintering furnace for sintering to strengthen a structure of the salt core.

In some embodiments, the salt material is a metal halide salt; in the preparing salt core step, the metal halide salt and a reinforcing agent are first dried, and then the metal halide salt dried, the reinforcing agent dried and a binder are mixed to be uniform and contain each other, and then the material mixed is placed in the molding cavity to prepare the salt core.

In some embodiments, the salt core dissolved is recycled for next preparation of the salt core.

Compared with the prior art, the present disclosure has the following technical effects.

1. The preparing method includes steps of preparing a salt core liner, installing connectors, winding carbon fiber, curing carbon fiber, removing salt core, and the like. The dried salt material is used as the material for preparing the liner, and the salt material cured and formed is used as the support body which has sufficient structural strength to be capable of being wound with the carbon fiber on the outer periphery side of the salt core liner so as to ensure that a shape of the wound carbon fiber reaches an expected design purpose and to ensure the structural strength of the wound carbon fiber. The salt core is directly dissolved by water after the high-pressure gas storage tank is prepared, to obtain the carbon fiber tank without an liner structure. The whole high-pressure gas storage tank is fully reduced in weight, convenient for transportation, and has increased inner volume which improves the storage capacity of the high-pressure gas storage tank. Furthermore, the salt core liner can be dissolved only by water, the dissolved salt core solution has no effect on the structural strength of the carbon fiber, thereby ensuring the structural strength and quality of the gas storage tank.

2. In the preparing salt core step, two ends of the salt core are provided with grooves coaxial with the salt core, the connectors are embedded in the grooves, edges of the connectors are smoothly connected with edges of the grooves. Corresponding to the two ends of the salt core, the molding cavity is provided with bosses for forming the grooves. By providing the connectors, the connectors can be firmly connected with the gas pipeline by selecting materials to avoid directly using carbon fiber to make the connectors, directly using carbon fiber to make the connectors is easy to cause abrasion when the carbon fiber connectors are connected with the gas pipeline. Further, by providing the grooves at the two ends of the salt core, the connectors can be embedded into the grooves, which can limit positions of the connectors so as to avoid displacement during the process of winding carbon fiber. Further, the edges of the connectors and the grooves are smoothly connected to ensure uniformity of the carbon fiber wound on the salt core and the connectors, thus ensuring firmness of the whole tank structure.

3. In the preparing salt core step, a central passage is provided through an axial center of the salt core. Openings at two ends of the central passage are respectively communicated with the corresponding grooves. A connecting rod for detachably connecting the two connectors is inserted into the central passage. By providing the central passage, the connecting rod can be easily inserted and connected, so that it can firmly connect the connectors so as to further ensure the stability of the connection of the connectors.

4. The molding cavity is provided with a molding rod for molding the central passage. The molding rod extends along an axis direction of the molding cavity. By providing the molding rod, it is convenient to directly forming the central passage by casting and there is no need to drill the salt core, which improves preparation efficiency of the salt core.

BRIEF DESCRIPTION OF THE DRAWINGS

In order to more clearly describe the technical solutions in the embodiments of the present disclosure or in the prior art, the following will briefly introduce the drawings for the embodiments. Apparently, the drawings in the following description are only some embodiments of the present disclosure. For those skilled in the art, other drawings can be obtained based on these drawings without paying creative efforts.

REFERENCE NUMERALS

Figure 1:
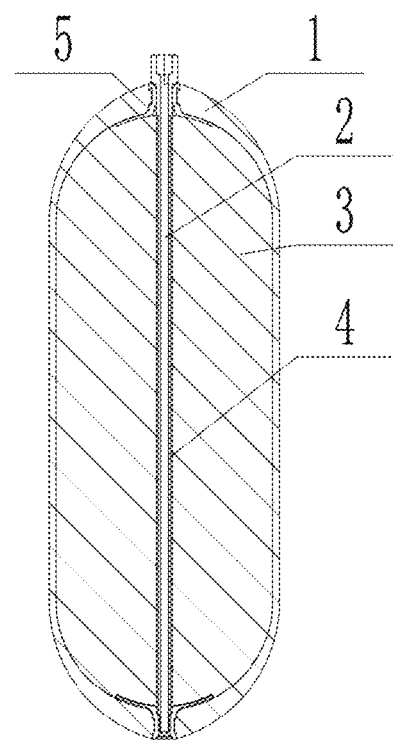
FIG. 1 is a cross-sectional view showing a structure of a salt core wound by carbon fiber according to the present disclosure.
Figure 2:
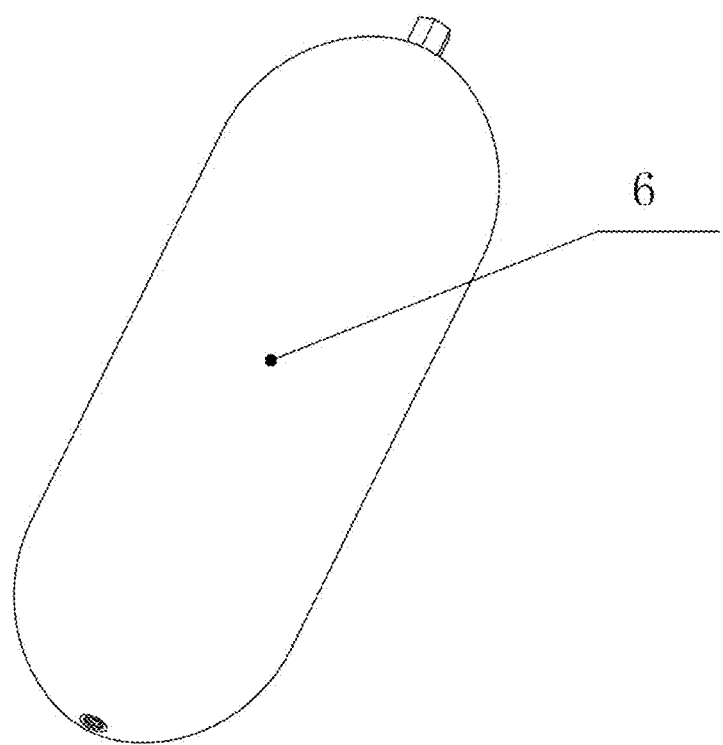
FIG. 2 is a cross-sectional view showing a structure of a high-pressure gas storage tank according to the present disclosure.
Figure 3:
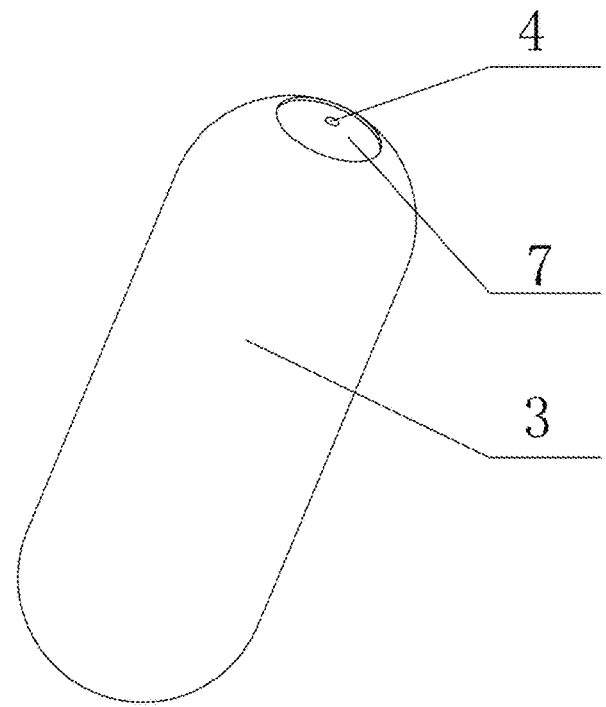
FIG. 3 is a cross-sectional view showing a structure of the salt core according to the present disclosure.

1 carbon fiber, 2 connecting rod, 3 salt core, 4 central passage, 5 connector, 6 high-pressure gas storage tank, and 7 groove.

DETAILED DESCRIPTION OF THE EMBODIMENTS

A purpose of the present disclosure is to provide a method for preparing a high-pressure gas storage tank without a liner to solve the problems existing in the prior art. In this method, a salt core is manufactured as a support body, carbon fibers are wound on an outer peripheral wall of the salt core, and the wound carbon fibers are cured to ensure strength thereof; after a tank is manufactured, the salt core is directly dissolved by water, and the dissolved salt core solution has no effect on structural strength of the carbon fibers, thereby ensuring quality of the whole tank.

In order to enable the above objects, features and advantages of the present disclosure to be understood more obviously and easily, the present disclosure will be described in further detail below in combination with the drawings and specific embodiments.

Referring to FIG. 1 to FIG. 4, this embodiment provides a method for manufacturing a high-pressure gas storage tank without a liner, including steps of manufacturing salt core liner, installing connector, winding carbon fiber, curing carbon fiber, and removing salt core.

In the manufacturing salt core liner, a mold is provided for forming a salt core 3. A molding cavity structure of the mold is matched with an inner cavity structure of a high-pressure gas storage tank 6 to be manufactured. Dried salt material is melted and poured into the molding cavity of the mold. In some embodiment, a size of a finished high-pressure gas storage tank 6 is 680 mm in height and 238 mm in diameter; then the molding cavity and the salt core 3 formed by the molding cavity each have an axial length of 680 mm and a diameter of 238 mm. The salt material in the molding cavity is pressurized, after the salt material is cooled, it is shaped in the molding cavity to the salt core 3 which matches the inner cavity structure of the high-pressure gas tank 6 to be prepared; in some embodiments, the salt material is dried before melted, so that water doped in the salt material is sufficiently removed to ensure that the salt material is formed into a compact and firm salt core 3 structure.

In the installing connector, two connectors 5 are provided for entering and leaving of high-pressure gas, and fixed at two ends of the salt core 3 along an axial direction of the salt core 3 to ensure that the connectors 5 are fixed during winding of the carbon fibers 1, so as to avoid displacement leading to failure of winding. In some embodiments, the two connectors 5 are configured as an inlet and an outlet. A model of the inlet is M18*1.5-6H and a model of the outlet is M12*1.25H to improve the feeding efficiency and discharge control. Moreover, the two connectors 5 are made of aluminum to ensure firmness of their connection with a gas pipeline.

In winding carbon fiber, the carbon fiber 1 is wound on an outer peripheral wall of the whole salt core 3 by a carbon fiber 1 winding equipment, and covers connection portions between the salt core 3 and the connectors 5; in some embodiments, in a process of winding the carbon fiber 1, T700 fiber is wound according to design requirements of 70 MPa to ensure the strength of the wound carbon fiber 1.

In curing carbon fiber, the salt core 3 wound with the carbon fiber 1 is put into a curing furnace for heating and curing to maintain a shape of the carbon fiber 1 wound on the salt core 3; in some embodiments, the wound carbon fiber 1 is soaked in the epoxy resin, and is cured and shaped by heating at 150 degrees in the curing furnace. It should be noted that in the present disclosure, after the carbon fiber 1 is wound on the salt core 3, the whole carbon fiber 1 is directly cured without removing the salt core 3 in advance, so as to ensure the shape of the carbon fiber 1 before curing, and thus ensure the shape and quality of the high-pressure gas storage tank 6 to be manufactured.

In removing salt core, water is filled through the connectors 5 towards an inside of the cured carbon fiber 1 for dissolving the salt core 3. After the salt core is dissolved, the inside of the cured carbon fiber 1 is cleaned, and the cured carbon fiber 1 is dried to complete preparation of the high-pressure gas storage tank 6. It is preferable to perform surface treatment on the gas storage tank after drying the water to ensure the structural strength of the gas storage tank surface.

The preparation method includes steps of preparing a salt core liner, installing the connectors 5, winding the carbon fiber 1, curing the carbon fiber 1, removing the salt core 3, and the like. The dried salt material is used as the material for preparing the liner, and the salt material cured and shaped is used as the support body which has sufficient structural strength so as to be capable of being wound with the carbon fiber 1 on the outer periphery side of the salt core liner, so that it is ensured that the shape of the wound carbon fiber 1 reaches the expected design purpose and the structural strength of the wound carbon fiber 1 is guaranteed. The salt core 3 is directly dissolved by water after the high-pressure gas storage tank is prepared, to obtain the carbon fiber 1 tank without the liner structure. The whole high-pressure gas storage tank is fully reduced in weight, convenient for transportation, and has increased inner volume, which improves the storage capacity of the high-pressure gas storage tank. Furthermore, the salt core liner can be dissolved only by water, the dissolved salt core 3 solution has no effect on the structural strength of the carbon fiber 1, thereby ensuring the structural strength and quality of the gas storage tank In some embodiments in order to facilitate the rapid heating and melting of the salt material, strong electrolyte materials are mixed in the salt material to reduce the melting point of the salt material. For example, if sodium chloride is used as the salt material, the strong electrolyte materials added are calcium chloride, etc. When calcium chloride is added, sodium chloride and calcium chloride are mixed in a ratio of 4:6, so that a melting point of the mixture of the calcium chloride and the sodium chloride can reach about 400° C., and be higher than the curing temperature of the carbon fiber 1, thereby avoiding that melting the salt core 3 leads to deteriorating support strength of the carbon fiber 1.

The salt material may also be other types of metal halide salts, which have water-soluble properties and may also be water-soluble KCl, LiCl, CuCl$_2$, CaCl$_2$, MgCl$_2$, BaCl$_2$, etc, besides sodium chloride. This kind of salt material has certain structural strength after melting to cooling, and is easy to dissolve in water after application. Further, in the process of preparing the salt core 3, in order to ensure its structural strength, the metal halide salt is used as a matrix, and the silicate colloid is used as an adhesion enhancer, such as Na$_2$SiO$_3$·12H$_2$O, etc., with mineral fine particles as reinforcing agents, such as talc powder, etc. The molding cavity of metal mold is adopted to form the salt core 3 in a way of a pressing formation, thereby effectively ensuring the molding quality of the salt core 3.

In the step of preparing the salt core 3, two ends of the salt core 3 are provided with grooves 7 coaxial with the salt core 3, the connectors 5 are embedded in the grooves 7, edges of the connectors 5 are smoothly connected with edges of the grooves 7. Corresponding to the two ends of the salt core 3, the molding cavity is provided with bosses for forming the grooves 7. By providing the connectors 5, the connectors can be firmly connected with the gas pipeline by selecting materials to avoid directly using carbon fiber to make the connectors 5, directly using carbon fiber to make the connectors 5 is easy to cause abrasion when the carbon fiber connectors are connected with the gas pipeline. Further, by providing the grooves 7 at two ends of the salt core 3, the connectors 5 can be embedded into the grooves 7, which can limit positions of the connectors 5 so as to avoid displacement during the process of winding carbon fiber; further, the edges of the connectors 5 and the grooves 7 are smoothly connected to ensure uniformity of the carbon fiber wound on the salt core 3 and the connectors 5, thus ensuring the firmness of the whole tank structure.

Figure 4:
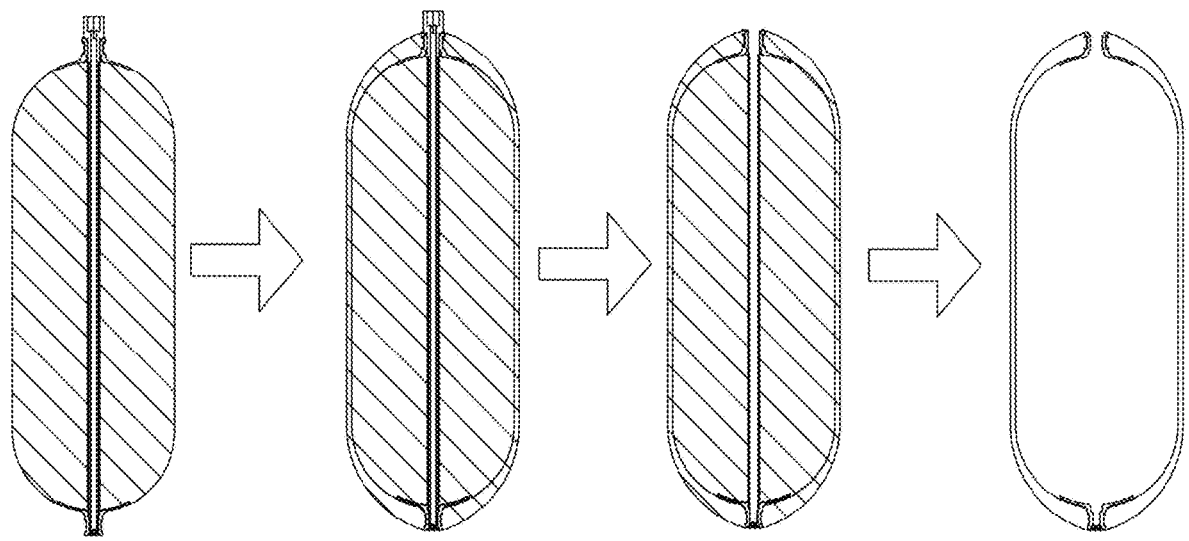
FIG. 4 is a flow chart for manufacturing the high-pressure gas storage tank according to the present disclosure.

Moreover, in the step of preparing the salt core 3, a central passage 4 is provided through an axial center of the salt core 3. Openings at two ends of the central passage 4 are respectively communicated with the corresponding grooves 7. A connecting rod 2 for detachably connecting the two connectors 5 is inserted into the central passage 4. By providing the central passage 4, the connecting rod 2 can be easily inserted and connected, so that it can firmly connect the connectors 5 so as to further ensure the stability of the connection of the connectors 5. The flow chart for use is shown in FIG. 4, in sequence, a schematic structural diagram in which the connecting rod 2 is inserted into the salt core 3 and connected with the connectors 5, a schematic structural diagram in which the carbon fiber is wound, a schematic structural diagram in which the connecting rod 2 is removed, and a schematic structural diagram in which the gas storage tank is finished.

Further, the molding cavity is provided with a molding rod for molding the central passage 4. The molding rod extends along an axis direction of the molding cavity. By providing the molding rod, it is convenient to directly forming the central passage 4 by casting and there is no need to drill the salt core 3, which improves preparation efficiency of the salt core 3 and prevents the structural strength of the salt core 3 from being damaged. In some embodiments, the molding rod is installed in a fixed mold part, and a movable mold part and the fixed mold part are combined to cover the molding rod inside. The mold is provided with structures which can be assembled and disassembled, such as two side plates and upper cover plates. The molding cavity is formed by assembling respective plate-like structure, and the molding cavity is communicated with compressed air. By pushing respective plate-like structure to pressurize the salt material structure, and further ensuring the pressurizing effect on the salt material through the compressed air, the structural compactness of the salt core 3 is ensured. It is preferable to spray a release agent on the inner wall of the mold before forming the salt core 3 to facilitate the release of the salt core 3.

Moreover, the connecting rod 2 passes through the connectors 5 and protrudes from sides of the connectors 5 away from the salt core 3. Ends of the connecting rod 2 protruding from the connectors 5 are detachably connected with annular sleeves for abutting the connectors 5. Through the annular sleeves, force is applied evenly on the connectors 5 along a circumferential direction so that the connectors 5 abut on the salt core 3 to avoid uneven stress on the connectors 5.

Furthermore, the annular sleeve and the connecting rod 2 are threadedly connected to facilitate disassembly and assembly of the annular sleeve and the connecting rod 2, and to facilitate application of force to the annular sleeve, so as to ensure firm connection between the annular sleeve and the connecting rod 2. In some embodiments, other socketed connection methods can be adopted.

Further, in the step of winding the carbon fiber 1, after each connector 5 is installed at the end of the salt core 3, an epoxy resin layer is coated on an outer peripheral side of the salt core 3 and the connector 5, which ensures compact combination of the connector 5 and the carbon fiber 1, and ensures that during the process of subsequent curing, the connector 5, the carbon fiber 1 and the epoxy resin layer can be combined adequately and the prepared high-pressure gas storage tank 6 can prevent leakage and block hydrogen leakage.

Moreover, after the step of preparing the salt core 3, the formed salt core 3 is placed in a sintering furnace for sintering to strengthen the structure of the salt core 3. It is preferable to sinter the salt core 3 for about 9 hours to 11 hours in the sintering furnace at a predetermined temperature of 600° C. to 700° C. A tensile strength of the sintered salt core 3 reaches 100 MPa and collapse time is not more than 50 min. During the actual preparation of the salt core 3, the salt core 3 may shrink to a certain extent. When forming the salt core 3, an actual size of the salt core 3 needs to be slightly larger than a size of the internal cavity of the prepared gas storage tank to balance the shrinkage rate of the salt core 3 and ensure the accuracy of the prepared gas storage tank.

Further, the salt material is a metal halide salt. In the step of preparing the salt core 3, the metal halide salt and the reinforcing agent are first dried, and then the dried metal halide salt, the dried reinforcing agent and the binder are mixed until they are mutually contained, and then the mixed material is placed in the molding cavity to make the salt core 3. In order to remove the water in the salt material, an oven can be provided, and the salt material can be placed in the oven for a certain time to volatilize the water inside the salt core 3, and the water can also be fully evaporated and removed during the melting process of the salt material and other materials by crucibles and other devices.

Further, the dissolved salt core 3 is recycled and used for next preparation of the salt core 3 to reduce waste of salt materials. Specifically, according to the properties of respective material, the hydrophilicity of the solvent is used to enable the salt in the solution to precipitate and crystallize. The solution is separated from the crystal salt through a filter, and the separated crystal salt is dried. When the dried crystal salt reaches the standard, it is put into a salt storage bucket; furthermore, the separated liquid is distilled to separate the solvent and the low salt water.

It should be understood that the application of the present disclosure is not limited to the examples described above, and these modifications or variations can be made according to the above description for those skilled in the art, all of which are intended to fall within the scope of the appended claims.

What is claimed is:

1. A method for preparing a high-pressure gas storage tank without a liner, comprising following steps:
   preparing salt core liner step, configured for providing a mold for forming a salt core, wherein a molding cavity of the mold is matched in structure with an inner cavity of the high-pressure gas storage tank to be prepared; melting salt material subjected to a drying treatment and pouring it into the molding cavity; pressurizing the salt material in the molding cavity, and cooling the salt material so as to be shaped into the salt core in the molding cavity, which match the inner cavity of the high-pressure gas storage tank to be prepared in structure;
   installing connector step, configured for providing two connectors for entering and leaving of high-pressure gas, and fixing the two connectors at two ends of the salt core along an axial direction of the salt core;
   winding carbon fiber step, configured for winding carbon fiber on an entire outer peripheral wall of the salt core by carbon fiber winding equipment, with connection portions between the salt core and the connectors being covered by the carbon fiber;
   curing carbon fiber step, configured for putting the salt core wound with the carbon fiber into a curing furnace for heating and curing to maintain a shape of the carbon fiber wound on the salt core; and
   removing salt core step, configured for filling water through the connectors towards an inside of the carbon fiber cured, for dissolving the salt core; cleaning and drying the inside of the carbon fiber cured after the salt core is dissolved, to complete preparation of the high-pressure gas storage tank;
   in the preparing salt core step, the two ends of the salt core are provided with grooves coaxial with the salt core, the connectors are embedded in the grooves, edges of the connectors are smoothly connected with edges of the grooves; and the molding cavity is provided with bosses, which are used for forming the grooves and correspond to the two ends of the salt core,
   in the preparing salt core step, a central passage is provided through an axial center of the salt core, openings at the two ends of the central passage are respectively communicated with the grooves, and a connecting rod for detachably connecting the two connectors is inserted in the central passage,
   a molding rod is provided in the molding cavity for forming the central passage, and the molding rod extends along an axial direction of the molding cavity,
   the connecting rod passes through the connectors and protrudes from sides of the connectors away from the salt core, and ends of the connecting rod protruding from the connectors are detachably connected with annular sleeves for abutting the connectors.

2. The method according to claim 1, wherein the annular sleeves are threadedly connected with the connecting rod.

3. The method according to claim 2, wherein in the winding carbon fiber step, after the two connectors are installed on the two ends of the salt core, an epoxy resin layer is coated on an outer peripheral side of the salt core and the connectors.

4. The method according to claim 3, wherein after the preparing salt core step, the salt core formed is placed in a sintering furnace for sintering to strengthen a structure of the salt core.

5. The method according to claim 1, wherein in the winding carbon fiber step, after the two connectors are installed on the two ends of the salt core, an epoxy resin layer is coated on an outer peripheral side of the salt core and the connectors.

6. The method according to claim 5, wherein after the preparing salt core step, the salt core formed is placed in a sintering furnace for sintering to strengthen a structure of the salt core.

7. The method according to claim 6, wherein the salt material is a metal halide salt; in the preparing salt core step, the metal halide salt and a reinforcing agent are first dried, and then the metal halide salt dried, the reinforcing agent dried and a binder are mixed to be uniform and contain each other, and then the material mixed is placed in the molding cavity to prepare the salt core.

8. The method according to claim 7, wherein the salt core dissolved is recycled for next preparation of the salt core.

* * * * *